Sept. 15, 1942.  S. PAGANELLO  2,296,179
EYE MOUNTING FOR DOLLS
Filed Jan. 23, 1942
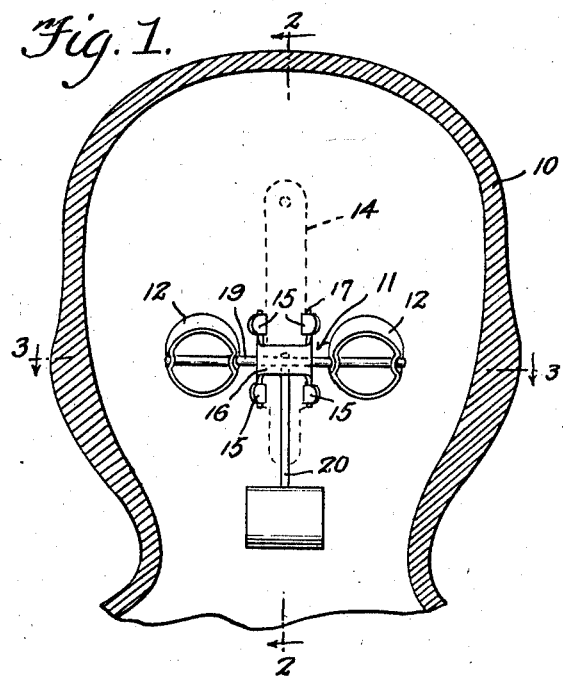
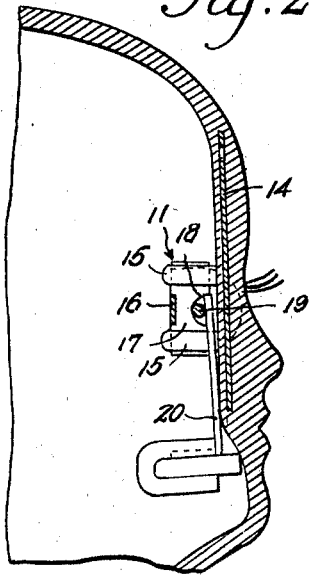
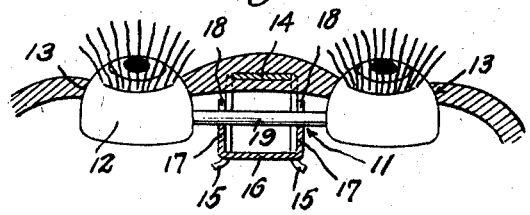
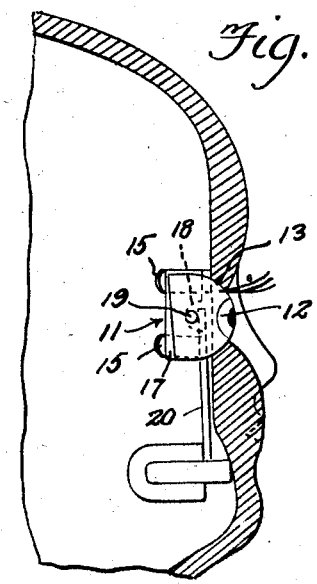
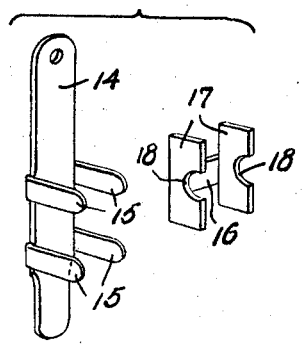
INVENTOR.
SALVATORE PAGANELLO
BY
Clark & Ott
ATTORNEYS Patented Sept. 15, 1942

2,296,179

UNITED STATES PATENT OFFICE 2,296,179

EYE MOUNTING FOR DOLLS

Salvatore Paganello, Brooklyn, N. Y.

Application January 23, 1942, Serial No. 427,868

4 Claims. (Cl. 46—169)

This invention relates to eye mountings for dolls and has particular reference to an improved mounting by means of which the eyes may be accurately positioned and supported for oscillatory movement in the eye openings of the doll head.

The invention more particularly resides in an eye mounting embodying interfitting parts providing a bearing for the oscillating shaft carrying the eyes, one of which parts is secured to the wall of the doll head, the other part being relatively adjustable longitudinally for facilitating the accurate positioning of the eyes in the eye openings and said parts being adapted to be interlocked for securing the eyes in position.

In the manufacture of doll heads of composition material the same are usually molded in two mating parts, one part including the front or face portion which extends rearwardly to approximately a vertical line at the rear of the ears, while the other part comprises the rear portion of the head and neck. Before the eye members and eye mounting are applied, and the parts of the head secured together, the face portion is drilled to provide eye openings having edges of rearwardly flared concave formation to receive the spheroidal shaped eye members. As the location of the eye openings varies slightly, the eye mountings must be adjusted accordingly in order that the eyes are accurately positioned with reference to the eye openings to permit of free oscillatory movement thereof so as to avoid binding of the same against the edges of the eye openings. It is, therefore, an object of the present invention to provide an eye mounting embodying a part which is affixed to the doll head during the molding of the front portion thereof and an interfitting bearing part capable of longitudinal adjustment for accurately and expeditiously positioning and securing the eyes in the eye openings within the limits of the usual variation of the location of the openings.

Another object in view is the provision of an eye mounting of the indicated character provided with means for supporting the eyes for free oscillatory movement in the eye openings so as to avoid binding engagement with the edges of the openings.

With the foregoing and other objects in view, reference is now made to the following specification and accompanying drawing in which there is illustrated the preferred embodiment thereof.

In the drawing:

Fig. 1 is a vertical section through a doll head illustrating a rear view of the eye mounting and eyes in applied position.

Fig. 2 is a vertical sectional view taken approximately on line 2—2 of Fig. 1.

Fig. 3 is an enlarged fragmentary transverse sectional view taken approximately on line 3—3 of Fig. 1.

Fig. 4 is a vertical sectional view taken approximately on the line 4—4 of Fig. 1.

Fig. 5 is a collective perspective view of the eye mounting members.

Referring to the drawing by characters of reference, the doll head 10 is of hollow formation and has an eye mounting, indicated generally by the reference character 11, affixed thereto for supporting the eyes 12 in the eye openings 13. The eye mounting 11 includes a supporting member affixed to the head and a cooperating member providing a bearing for the eyes which bearing member is relatively adjustable longitudinally of the supporting member so as to support and retain the eyes in registry with the eye openings for oscillatory movement therein without binding against the edges of the openings.

The supporting member includes an elongated flat strip 14 of metal or other equivalent stiff bendable material provided with longitudinally spaced pairs of tongues 15 at the side edges thereof. The strip 14 is affixed to the head in any desired manner such as by molding the same in the wall thereof or otherwise anchoring the strip thereto to thereby dispose the same vertically of the head and substantially midway between the eye openings. The tongues 15 project rearwardly from the strip 14 into the hollow interior of the head, the tongues of each pair being spaced transversely of the head and the tongues of one of the pairs being aligned vertically with the tongues of the other pair respectively.

The bearing member consists of a web 16 and parallel flanges 17 at the opposite ends thereof which project in opposite directions beyond the upper and lower edges of the web. The bearing member is adapted to be applied to the supporting member with the web 16 disposed between the pairs of tongues and the flanges 17 arranged alongside and outwardly of the aligned tongues respectively with the ends of the tongues extending rearwardly beyond and bent into overlying clamping relation with the projecting ends of the flanges. The flanges 17 are provided with inwardly extending recesses 18 in the forward edges thereof in which is mounted for free rocking movement a transversely extending rock shaft 19 to the opposite end of which the eyes 12 are secured for movement therewith. The rock shaft 19 is provided intermediate the flanges 17 with a pendulum or weighted member 20 to provide means for imparting oscillatory or rocking movement to the eyes upon tilting of the doll head. The eyes are of hemispherical formation and have sliding engagement with the rearwardly flared concave edges of the eye openings.

As the eye openings are formed by drilling and reaming operations, the same vary slightly as to their vertical location. In order to position the eyes in registration with the eye openings so as to permit of free oscillatory movement thereof and to avoid binding of the eyes against the edges of the openings, the bearing member is vertically adjustable with reference to the supporting member to compensate for said variance in the vertical location of the eye openings.

To register the eyes with the eye openings, the rock shaft 19 is inserted in the recesses 18 of the bearing member which is then applied in straddling relation with the supporting member and adjusted vertically thereof to locate the eyes in the eye openings with the forward curved portions of the eyes having free sliding engagement with the inwardly curved concave edges of said openings.

The web 16 of the bearing member is of a lesser width than the vertical spacing of the pairs of tongues 15 so as to permit of vertical adjustment of the bearing member. When so adjusted, the tongues are bent outwardly into impinging relation with the projecting ends of the flanges 17 and the free ends of the tongues bent into overlying clamping relation with the upper edges of the flanges. These operations may be accomplished expeditiously so as to facilitate the assembly of the eyes with the doll head.

Furthermore, the mounting provides a support for the eyes which allows for free swinging movement thereof since the width of the notches 18 exceeds the diameter of the rock shaft 19 so that the concave inner edges of the recesses have limited bearing engagement with the rock shaft and permits the rock shaft to move in the recesses to avoid binding of the forward portion of the eyes against the curved edges of the eye openings.

What is claimed is:

1. In an eye mounting for dolls, a supporting member embedded in the wall of the doll head and including pairs of vertically spaced tongues projecting rearwardly into the hollow interior of the doll head, the tongues of each pair being transversely spaced and the tongues of one pair being aligned vertically with the tongues of the other pair respectively, a bearing member including a transversely arranged web and opposite side flanges projecting beyond the upper and lower edges of the web and each having a recess extending inwardly from the forward edge thereof, said bearing member being arranged in straddling relation with the supporting member to dispose the web between the pairs of tongues and the side flanges alongside and outwardly of the tongues, and an eye secured to each of the opposite ends of a shaft positioned in said inwardly extending recesses, said web being of a lesser width than the spacing between the pairs of tongues so as to permit of relative longitudinal adjustment of the bearing member to accurately position the eyes in the eye openings in the doll head, and said tongues being adapted to be interlocked with the projecting ends of the side flanges for securing the bearing member in fixed relation with the supporting member and the eyes positioned in the eye openings.

2. In an eye mounting for dolls, interengageable eye mounting members, one of said members including a plurality of pairs of vertically spaced tongues, the tongues of each pair being transversely spaced and the tongues of one pair being aligned vertically with the tongues of the other pair respectively, the other of said members including side flanges each having a recess extending inwardly from the edge thereof, one of said members being affixed to the wall of the doll head and the other being arranged to dispose the flanges adjacent to and alongside of the aligned tongues respectively, a rock shaft positioned in the recesses of said flanges and an eye mounted upon each of the opposite ends of said shaft for rocking movement therewith, said interengageable members being relatively adjustable longitudinally to accurately position the eye members in the eye openings in the doll head, and said tongues being adapted to be impinged against the side flanges for securing the mounting members together and the eyes positioned in the eye openings respectively.

3. In an eye mounting for dolls, a supporting member including an elongated flat strip embedded in the wall of the doll head substantially midway between the eye openings and extending vertically of the head and having upper and lower pairs of tongues projecting rearwardly into the hollow interior of the head, the tongues of each pair being transversely spaced and the tongues of the lower pair being in substantially vertical alignment with the tongues of the upper pair, a bearing member including a transversely extending centrally arranged web and opposite side flanges projecting beyond the upper and lower edges of the web and each having a recess extending inwardly from the forward edge thereof, said bearing member being arranged with reference to the supporting member to dispose the web thereof between the upper and lower pairs of tongues and the side flanges adjacent to and alongside of the pairs of tongues respectively, a rock shaft mounted in said recesses, an eye secured to each of the opposite ends of said shaft, said web being of a lesser width than the spacing between the upper and lower pairs of tongues to permit of relative adjustment of the bearing member with reference to the supporting member so as to accurately position the eyes in the eye openings in the doll head, said tongues being impinged against the projecting ends of said flanges for securing the bearing member in fixed relation and the eyes positioned in the eye openings.

4. In an eye mounting for dolls, a supporting member embedded in the wall of the doll head and having tongues projecting rearwardly into the hollow interior of the doll head, a bearing member including side flanges each having a recess extending inwardly from the forward edge thereof, a rock shaft mounted in said recesses and an eye secured to each of the opposite ends of said shaft, said bearing member being longitudinally adjustable with reference to the supporting member so as to accurately position the eyes in the eye openings in the doll head and said tongues of the supporting member being bent adjacent the free ends into overlying relation with said flanges for holding the bearing member between the bent over ends of said tongues and said rock shaft disposed against the inner edges of the recesses with the free longitudinal edges of the flanges spaced from the wall of the doll and with the eyes bearing in the eye openings.

SALVATORE PAGANELLO.